United States Patent

Woodruff

Patent Number: 5,441,180
Date of Patent: Aug. 15, 1995

[54] DISPENSER GUN FOR VISCOUS OR SEMI-VISCOUS PRODUCTS

[75] Inventor: Keith F. Woodruff, Mountainside, N.J.

[73] Assignee: American Cyanamid Company, Wayne, N.J.

[21] Appl. No.: 151,729

[22] Filed: Nov. 12, 1993

Related U.S. Application Data

[63] Continuation-in-part of Ser. No. 82,405, Jun. 23, 1993.

[51] Int. Cl.$^6$ ............................................. B67D 5/42
[52] U.S. Cl. ............................ 222/327; 222/387; 222/562; 222/383.3
[58] Field of Search ............... 285/924; 215/307; 220/366; 222/327, 383, 386, 387, 221, 481, 542, 562

[56] References Cited

U.S. PATENT DOCUMENTS

| | | | |
|---|---|---|---|
| 1,385,307 | 7/1921 | Condon | 222/341 X |
| 1,643,761 | 9/1927 | Appleby | 222/321 |
| 1,703,286 | 2/1929 | Zerk | 222/321 |
| 1,757,736 | 5/1930 | Pritchard | 222/340 X |
| 1,886,022 | 11/1932 | Hutton | 222/309 |
| 1,987,002 | 1/1935 | Dodge | 222/327 |
| 2,063,410 | 12/1936 | Tear | 222/327 |
| 2,323,099 | 6/1943 | Patten | 285/924 X |
| 2,595,118 | 4/1952 | Anderson | 222/309 |
| 2,703,191 | 3/1955 | Jernander | 222/341 X |
| 3,141,583 | 7/1964 | Mapel et al. | 222/309 |
| 3,211,340 | 10/1965 | Zander et al. | 222/340 X |
| 3,517,668 | 6/1970 | Brickson | 222/309 |
| 3,540,760 | 3/1969 | Miller | 285/924 X |
| 3,545,680 | 12/1970 | Ottaway | 239/413 |
| 4,062,480 | 12/1977 | Bjorklund | 222/517 |
| 4,083,474 | 4/1978 | Waite et al. | 222/145 |
| 4,161,288 | 7/1979 | McKinney | 239/333 |
| 4,330,070 | 5/1982 | Doubleday | 222/287 X |
| 4,345,718 | 8/1982 | Horvath | 222/340 X |
| 4,394,945 | 7/1983 | Taylor, Jr. | 222/571 |
| 4,456,153 | 6/1984 | Meshberg | 222/324 X |
| 4,531,912 | 7/1985 | Schuss et al. | 222/571 |
| 4,678,107 | 7/1987 | Ennis, III | 222/571 |
| 4,747,502 | 5/1988 | Luenser | 220/366 X |
| 4,796,786 | 1/1989 | Czech | 222/327 X |
| 4,809,885 | 3/1989 | Hayashi et al. | 222/571 |
| 4,821,927 | 4/1989 | Paulsen et al. | 222/340 |
| 4,890,773 | 1/1990 | Corsette | 222/387 X |
| 4,923,096 | 5/1990 | Ennis, III | 222/571 |
| 4,991,747 | 2/1991 | Van Brocklin | 222/341 |
| 5,022,563 | 6/1991 | Marchitto et al. | 222/327 |
| 5,027,605 | 7/1991 | Hardesty | 222/341 X |
| 5,064,098 | 11/1991 | Hutter, III et al. | 222/137 |
| 5,065,910 | 11/1991 | Fiedler | 222/504 |
| 5,100,027 | 3/1992 | Guéret | 222/387 X |
| 5,137,187 | 8/1992 | Nichols et al. | 222/504 |
| 5,147,059 | 9/1992 | Olsen et al. | 220/366 X |

FOREIGN PATENT DOCUMENTS

0351441 1/1990 European Pat. Off. ............ 222/327

*Primary Examiner*—Andres Kashnikow
*Assistant Examiner*—Kenneth Bomberg
*Attorney, Agent, or Firm*—Mark P. Stone

[57] ABSTRACT

A dispenser gun for selectively dispensing controlled quantities of viscous or semi-viscous materials, and in particular liquid pesticides or insecticides, employs a vacuum driven operating system for discharging and reloading the viscous or semi-viscous materials to be discharged. The dispenser gun is designed to create pressure differentials in adjoining chambers which, in conjunction with a cooperating valve system, enables the discharge of precisely metered quantities of material and prevents continued and undesired discharge or dripping from a discharge nozzle after a preselected quantity of material has been discharged from the dispenser gun. The handle of the device includes structure for pre-selecting one or more predetermined quantites of material to be discharged from the dispenser in repeatable sequences. The dispenser gun also includes structure for removably receiving a replaceable reservoir of viscous or semi-viscous material to be discharged from the gun.

20 Claims, 6 Drawing Sheets

DISPENSER GUN FOR VISCOUS OR SEMI-VISCOUS PRODUCTS

This patent application is a continuation-in-part of U.S. patent applicaton Ser. No. 08/082,405, filed Jun. 23, 1993, currently pending.

BACKGROUND OF THE INVENTION

The present invention is directed to dispensing devices for discharging predetermined quantities of viscous or semi-viscous materials from the nozzle of a gun-like device having a manually actuated trigger structure for selectively discharging the materials from the gun. In particular, the discharge device of the present invention is primarily adapted for the application of relatively small quantities of viscous or semi-viscous liquid insecticides or pesticides to be applied to relatively small target areas in accurate and repeatable sequences.

The following United States patents represent typical prior art dispensing devices for discharging liquid materials, including viscous or semi-viscous materials: U.S. Pat. Nos. 3,141,583; 3,517,688; 3,545,680; 4,062,480; 4,083,474; 4,394,945; 4,531,912; 4,678,107; 4,809,885; 4,821,927; 4,923,096; 4,991,747; 5,022,563; 5,064,098; 5,065,910; and 5,137,187.

It is an object of the present invention to overcome disadvantages of the known prior art dispensing guns. In particular, the discharge devices encompassed within the scope of the present invention provide manually actuated dispensing guns including means for presetting selected quantities of material to be discharged from the device, and assuring that the precisely metered quantity of discharged material are applied in repeatable sequences at the selection of the user. The dispensing gun is adapted to operate as a vacuum driven system, and includes suction generating means for evacuating a discharge chamber to prevent dripping of material from the gun after the desired quantity of material has been discharged. The dispensing gun is particularly adapted to the discharge and application of viscous and semi-viscous materials, and in particular, liquid pesticides and insecticides, which, by the nature of the products, precisely measured, relatively small quantities of material are discharged and applied to well defined and closely confined target locations. It is the further object of the present invention to provide a dispensing device including means for adjusting one or more of the preset quantities of material dischargeable from the gun, and further providing means for readily enabling the user to discharge the same predetermined quantities of material from the gun in easily repeatable selected sequences.

Other objects and advantages of the present invention will become apparent from the following discussion in conjunction with the accompanying drawings.

SUMMARY OF THE INVENTION

The present invention provides a manually operated, trigger actuated gun.-like dispensing device for selectively discharging predetermined quantities of material through a discharge nozzle for application of the discharged material to a predetermined target location. The dispensing device is particularly adapted to selectively discharge one or more preselected, relatively small quantities of viscous or semi-viscous material, particularly liquid insecticides or pesticides or other similar materials, in precisely metered, adjustable quantities, and in readily repeatable sequences.

The dispensing device includes a housing section for removably receiving a replaceable container holding the material to be dispensed from the device. A manually actuated, spring biased trigger is included within a handle section of the device, and means are provided for adjusting and limiting the relative movement of the trigger to discharge one or more different predetermined quantities of material from a forward discharge nozzle of the dispensing device. Actuation of the trigger advances a piston in a forward direction to expel either viscous or semi-viscous material from a forward discharge chamber of the dispensing device by decreasing the volume of the forward chamber and increasing the pressure therein, and to subsequently draw additional material into the discharge chamber through the creation of a partial vacuum as the chamber volume expands when the piston retracts into its relaxed position as a result of a resilient bias applied thereon. Material remaining in the forward nozzle and not discharged therefrom during the forward discharge stroke of the piston is drawn back into the forward discharge chamber around a displaceable flap covering a forward outlet opening in the discharge chamber. The flap is displaced by the partial vacuum created as a result of the rearward return movement of the piston towards its relaxed operating position, thereby avoiding the undesirable accumulation of non-discharged residual material in the discharge nozzle and the resulting continuous discharge of dripping material after the piston has completed its forward discharge stroke. Accordingly, both the discharge of material from the discharge chamber during the forward piston stroke and the reloading of the discharge chamber (including both the forward evacuation of material from the rearwardly disposed supply container, and rearward evacuation of any residual material remaining in the forward discharge nozzle from the previous discharge stroke) during the return piston stroke, is accomplished by a system which is primarily vacuum driven as a result of the creation of pressure differentials in the discharge chamber.

The dispensing device of the present invention is adapted to discharge precisely measured quantities of viscous or semi-viscous material, preferably relatively small quantities of insecticide or pesticide, in a repeatable sequence. The dispensing device employs structure and and operative relationship of structure, including an adjustable volume discharge chamber with a cooperating rear valve and forward flap, to both discharge precisely measure small quantities of viscous or semi-viscous materials, and to automatically reload the discharge chamber by evacuation of material from the rearwardly positioned liquid reservoir and by simultaneous evacuation of non-discharged material from the forwardly positioned discharge nozzle. Although the dispensing device of the present invention is intended to apply relatively small quantities of viscous or semi-viscous insecticide or pesticide, it is nonetheless within the scope of the invention to use the device for applying materials other than insecticides or pesticides.

In the preferred embodiments of the invention, the rear end of the product tube received within the dispensing gun is crimped to provide stop means for retaining a discharge piston securely within the product tube. The adapter receiving the product tube is provided with means for venting air from the adapter as the adapter and product tube are removably received within the pump housing of the dispensing device to prevent air from mixing with the product. A cap which is removably mounted over the discharge end of the product tube and adapter before the product tube and adapter are received within the pump housing of the device, is also provided with vent means to prevent air from mixing with the product within the tube while the cap is mounted to the discharge end thereof. Venting means provided in the adapter and the cap prevent air from being entrapped with the product in the tube and avoid the potential undesirable loss of prime to the pump which might otherwise result from air mixing with the product within the tube.

DETAILED DESCRIPTION OF THE PREFERRED EMBODIMENTS OF THE INVENTION

The structure and operation of a dispensing device in accordance with the present invention will now be described in greater detail with respect to the accompanying drawing figures.

Figure 1:
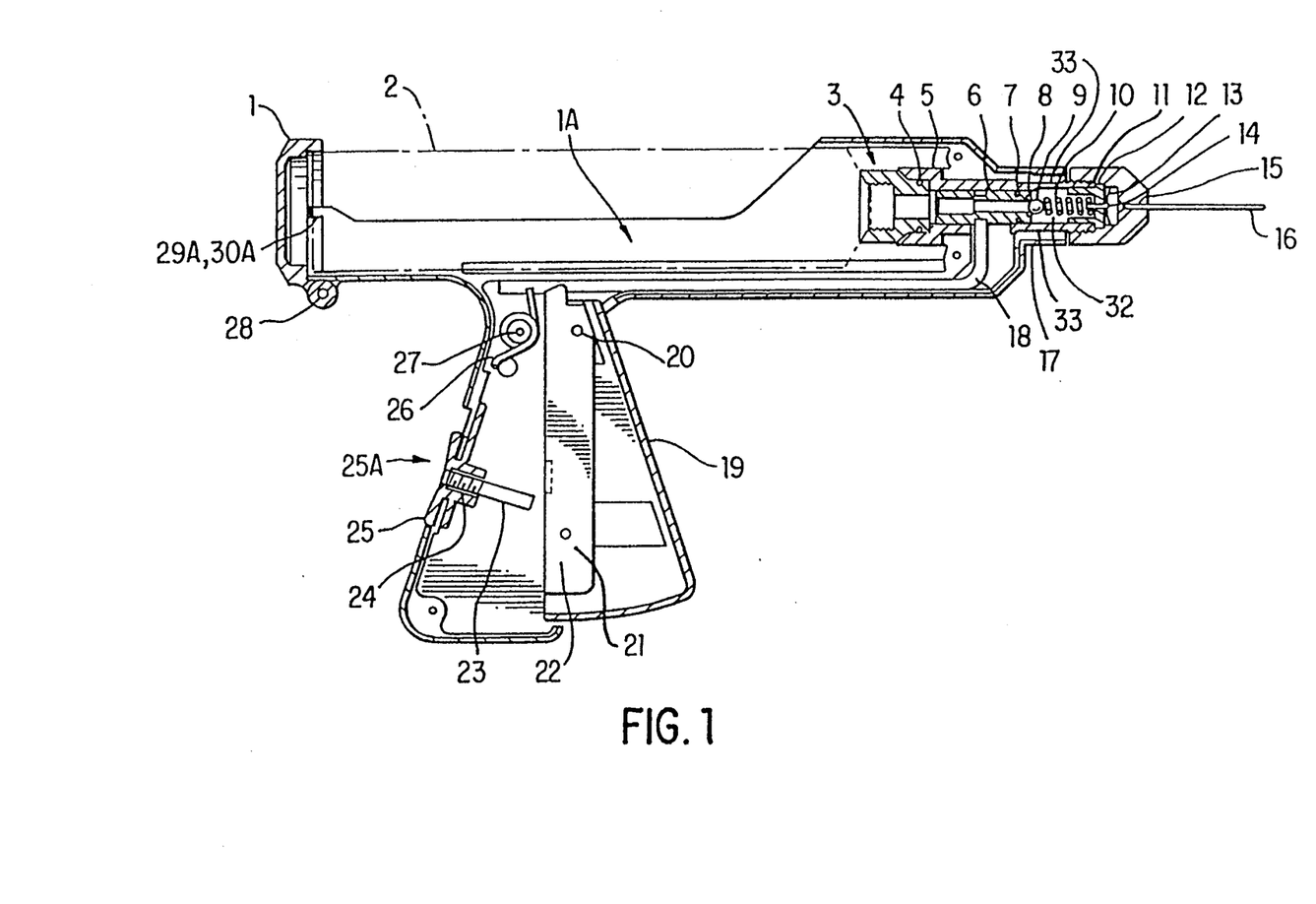
FIG. 1 of the drawing illustrates a sectional view of a dispenser gun in accordance with the present invention.

FIG. 1 of the drawing illustrates the preferred embodiment of a dispenser device for viscous or semi-viscous liquids in accordance With the present invention. The dispensing device includes a longitudinally extending housing section generally designated by the reference numeral 1A, a rear end cap 1 pivotably mounted to the rear of the housing 1A for removably mounting a reservoir 2 containing a viscous or semi-viscous liquid material to the housing 1A, and a handle section generally designated by reference numeral 25A extending downwardly from the lower surface of the housing 1A. A discharge needle 16 defining a discharge opening at the forwardmost end thereof extends from a nozzle cap 15 mounted to the forwardmost end of the dispenser housing 1A.

An adapter 3 and an adapter O-ring 4 are provided as part of the forward assembly of the discharge end of the removably mounted liquid containing reservoir 2. A cylinder 5 surrounds the O-ring 4 to firmly maintain a sealing engagement of the discharge end of the product reservoir container 2. A hollow piston 6 defining a centrally disposed bore extending therethrough is mounted forward of the discharge end of the reservoir 2, and the bore of the piston is in substantial axial alignment with the tapered discharge end of the reservoir 2. In this manner, as will be discussed in greater detail below, liquid from the reservoir 2 flows from the discharge opening in the reservoir in a substantially straight or longitudinal path directed forwardly into the centrally disposed bore defined in the piston. A portion of an outer surface of the piston 6 defines a notch or recessed section for receiving the remote end of a steel trigger bar 18. As will also be discussed in greater detail below, the coupling of the trigger bar 18 to the piston enables selective movement of the piston upon actuation of the trigger to discharge material from the forward needle 16 of the dispensing gun.

A pair of O-rings 7 are disposed around the outer surface of the piston 6 to provide sealing engagement therewith. The forward end of the centrally disposed bore defined within the piston 6 terminates in a check valve 9 which includes an O-ring 8 to enhance the sealing integrity of the valve. The check valve 9 includes a longitudinally extending spring 10 which exerts a resilient force on the ball valve 9 to maintain the valve in a sealing relationship against the forward opened end of the centrally disposed, longitudinally extending bore defined within the piston 6. Accordingly, the spring 10, in its relaxed normal operating positions will maintain the check valve in a closed position to seal the forward end of the bore defined in the piston.

A forward discharge chamber 32 is defined between a pair of opposed, longitudinally extending sidewalls 33 fixedly mounted relative to the housing 1A. The rear end of the discharge chamber is defined by the forward end of the piston 6, including the ball valve 9 seated in the forward discharge end of the bore defined within the piston. The forward end of the discharge chamber is defined by a flap valve assembly comprising a flap housing 12 and a flap element 13 movably secured to the forward end of the flap housing 12 and adapted to selectively cover one or more bores defined in the forward end of the flap housing and extending therethrough in fluid communication with the discharge chamber 32. The flap is mounted to the forward surface of the flap housing by a rivet 14. The forward assembly of the dispensing device further comprises a collar 17 mounted around a portion of the tapered forward end of the housing section 1A, and a nozzle cap 15 extending forward of the collar 17 and providing means for mounting the discharge needle 16 therein such that the discharge needle is in substantial alignment with the substantially axially directed flow of material from the forward discharge chamber 32, as will be discussed in greater detail below.

The handle section 25A of the dispensing gun generally comprises a downwardly extending handle 25 fixedly mounted relative to the longitudinally extending housing 1A. A movable trigger section 19 is pivotably mounted relative to the handle section 25 by a pivot pin 20. Relative movement of the trigger 19 towards the handle 25 results in forward movement of the trigger bar 18 to advance the piston 6 which is coupled to the trigger bar in the manner previously described herein. A trigger spring 26, which is mounted to the handle section 25 by means of mounting screws 27, resiliently biases the trigger 19 away from the handle section 25. Accordingly, when manual pressure is released from the trigger section 19, the trigger spring 26 causes movement of the trigger 19 away from the handle section 25, which in turn causes the piston bar 18 to retract the piston 6 rearwardly in the housing section 1A to supplement the resilient force also applied in a rearwardly direction to the piston 6 by the spring 10 as previously discussed.

Still referring to FIG. 1 of the drawing, the handle section 25 includes a threaded insert 24 directed into the handle for receiving an adjustment screw 23 in an opening defined in the insert. The adjustment screw cooperates with a trigger stop 22 fixedly mounted on the trigger 19 and pivotably movable therewith, to adjust the maximum permitted range of movement of the trigger section 19 relative to the handle section 25 to control the quantity of material discharged from the dispensing gun by controlling the extent of movement of the piston.6 into the discharge chamber 32.

Figure 2:
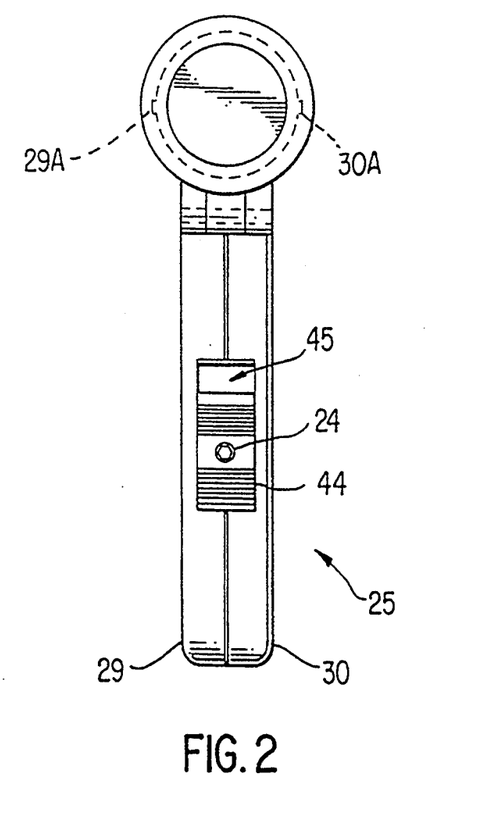
FIG. 2 of the drawing illustrates a rear elevational view, in section, of the dispensing gun shown in FIG. 1 illustrating a removable reservoir retained within the housing and an adjustment element on the handle section for setting a predetermined quantity of material to be discharged from the dispenser gun upon actuation of the trigger of the gun.
Figure 3:
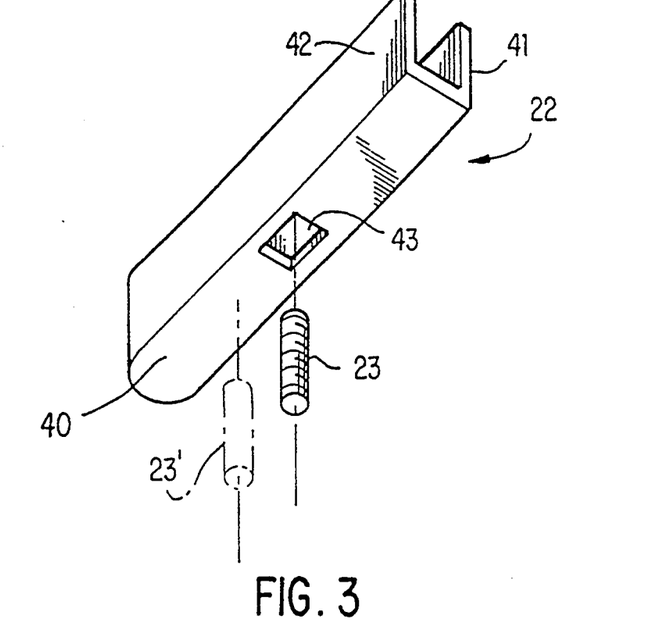
FIG. 3 of the drawing illustrates, in perspective, a portion of the handle section of the dispenser gun which acts as an adjustable stop element for metering the quantity of material to be discharged from the dispensing device upon actuation of a trigger element.

As more fully illustrated by FIG. 3, the trigger stop 22 is formed from a substantially U-shaped bar having a middle section 40 and two opposed sidewalls 41 and 42. An opening 43 is defined in the approximate center of the middle section 40 of the stop element 22. The opening 43 is sufficiently large to receive therethrough the adjustment screw 23 extending into the handle section 25 when the trigger is moved relative to the handle and the adjustment screw is aligned with the opening 43 in the trigger stop 22. When such alignment occurs, the trigger is movable through its maximum range relative to the handle. When more restrictive movement is desired, the insert 24 is movable relative to the handle 25 and the trigger stop 22 such that the opening 43 is no longer in alignment with the adjustment screw 23 extending into the handle. (The manner in which the insert 24 is movable relative to the trigger stop 22 is further described in the discussion of FIG. 2). When the screw and opening are out of alignment, relative movement of the trigger towards the handle is impeded by the screw which abuts against a closed surface portion of the middle section 40 of the trigger stop 22, as illustrated by the reference numeral 23' in FIG. 3. The extension of the screw 23 into the handle section 25 is variable so as to adjust the range of relative movement between the trigger and the handle before said relative movement is stopped by the abutment of the forward end of the screw 23 against the stop 22. In this manner, the quantity of material discharged from the dispensing device is variable by adjusting the range of maximum relative movement between the trigger and the handle which directly corresponds to the forward movement of the piston 6 in the housing 1A which also corresponds to the quantity of material discharged from the discharge chamber 32. Accordingly, the predetermined quantity of material to be discharged from the dispensing gun is controlled and selectively adjusted as a result of cooperation between the position of the trigger stop 22 relative to the insert 24 on the handle 25, and also the distance which the adjustment screw 23 extends into the handle section 25.

Referring to FIG. 2 of the drawing, a rear elevational view of the dispensing gun is illustrated partially in section. The handle 25 is formed from two separate halves 29 and 30 which are mated together by conventional means such as the collar 17 illustrated in FIG. 1. A rectangular opening 45 is defined generally in the center of the handle 25. A slide element 44 is movable within the opening 45, and the slide 44 carries the threaded insert 24 for receiving the adjustment screw 23 (See FIG. 1). Accordingly, movement of the slide element 44 in the opening 45 relative to the handle section 25 correspondingly moves the threaded insert 24 and the adjustment screw received therein, selectively into and out of alignment with the opening 43 in the trigger stop 22 (See FIG. 3). As previously discussed, axial alignment and non-alignment of the adjustment screw 23 carried by the handle 25 with the opening 43 in the trigger stop 22 carried by the trigger 19 controls the maximum permitted range of relative movement between the trigger 19 and the handle 25.

Still referring to FIG. 2, the housing 1A removably receives a product container tube 2 when the rear end cap 1 hingedly mounted to the rear of the housing is pivoted into an open position. The housing defines two opposed extensions 29A and 30A for removably receiving complementary configured grooves in hinged cap 1. The complementary configured extensions and grooves assure a firm friction fit between the hinged cap 1 and the housing 1A. The product container 2 is then removably received within housing 1A and the hinged cap 1 is pivoted into its closed position as illustrated in FIG. 1.

The operation of the dispensing gun in accordance with the present invention will now be discussed with reference to FIGS. 1 and 4 of the drawing. Referring first to FIG. 1, actuation of the trigger 19 by manual movement thereof towards the handle 25, against the bias of trigger spring 26, causes forward movement of the trigger bar 18. The trigger bar is coupled to the piston 6, as previously described, such that advancement of the trigger drives the piston forward in the housing in a direction towards the discharge needle 16. More specifically, as the piston 6 advances forward into the discharge chamber 32, the forward end of the bore extending through the piston is sealed as a result of the resilient force applied on a check valve 9 by a valve spring 10 to seat a ball on the discharge end of the bore to seal the forward end of the bore defined in the piston adjacent to the discharge chamber 32. Forward movement of the piston into the discharge chamber 32 decreases the volume of the chamber, thereby increasing the pressure therein, to force material within the chamber forwardly through a plurality of discharge ports 50 and 52 (illustrated by FIG. 4) defined in the outlet end of the discharge chamber. The material flows through the discharge needle 16 and is discharged from the dispensing gun and applied to a predetermined target area. As previously discussed, the relative movement of the trigger 19 towards the handle 25 is adjustable to control the forward movement of the piston 6 into the discharge chamber 32, thereby controlling the quantity of material discharged from the dispensing gun in response to actuation of the trigger.

Figure 4:
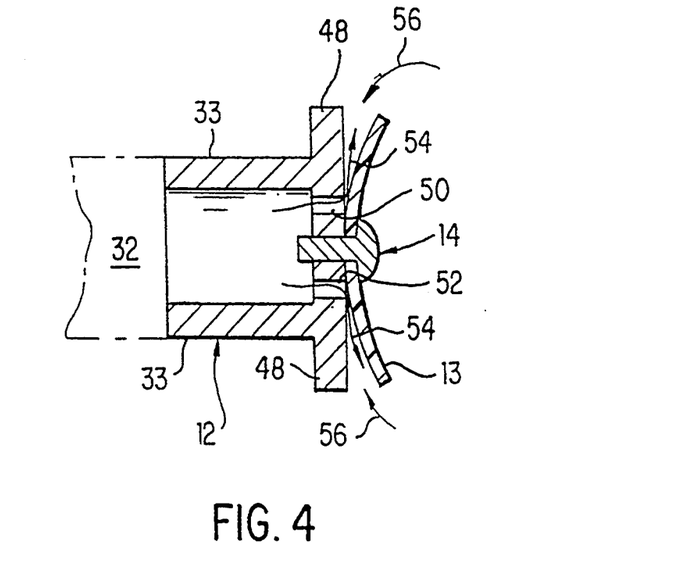
FIG. 4 of the drawing illustrates the forward portion of a discharge chamber of the dispenser gun shown in FIG. 1.

FIG. 4 of the drawing illustrates the forward outlet end of the discharge chamber 32 in greater detail. A forward discharge end wall 48 defines at least one discharge port (50, 52). A displaceable flap 13 is mounted to the outer surface of the forward end wall 48 by a rivet 14, and preferably at least one discharge outlet port (50, 52) is disposed on each side of the rivet 14. The flap housing 12, as illustrated in FIG. 1, defines the discharge chamber 32 between the opposed sidewalls 33 and the forward end wall 48. The flap is formed from a pliable material, preferably a latex material, having a thickness in the order of 1/30,000 inch. As the pressure in the discharge chamber 32 is increased by the forward movement of the piston 6, the material within the discharge chamber 32 is forced to flow forwardly through the outlet ports (50, 52) in the end wall 48, displacing the portions of the flap 13 covering the ports, so that the material is discharged through the outlet ports. The discharged material flows through the ports and into the forward needle 16, to be discharged from the dispensing gun.

After a predetermined quantity of material has been discharged from the dispensing gun as described above (the quantity of discharged material having been preselected as a result of adjustment of the trigger control means previously discussed herein), the trigger. 19 is forced to move in a direction away from the handle 25 as a result of the resilient force applied to the trigger by the trigger spring 26. The relative movement of the trigger in a direction forwardly away from the handle 25 causes the trigger bar 18 to be retracted in a direction towards the rear of the longitudinally extending housing 1A. The rearwardly retracted movement of the trigger bar causes rearward movement of the coupled piston 6 relative to the discharge chamber 32. The rearward movement of the piston 6 is further supplemented by the resilient force applied by the valve spring 10 on the forward end of the piston 6 as the valve spring returns to its relaxed position. As the piston 6 is moved in a rearward direction, the discharge chamber 32 increases in volume, thereby decreasing the pressure therein. As a result of the reduced pressure in the discharge chamber 32, suction is generated drawing material from the discharge outlet of the rearwardly disposed product container tube 2 forwardly through the bore in the piston 6, and into the forward discharge chamber 32. The forward flow of material through the bore in the piston as a result of the reduced pressure in the discharge chamber causes displacement of the ball valve 9 from the valve seat to unseal the forward discharge end of the bore in the piston to permit flow of material from the bore and into the forward discharge chamber. Simultaneously with the forward flow of material from the rearwardly disposed product container tube 2, residual material which may still remain in the discharge needle 16 (or in other positions forward of the discharge chamber 32) is drawn rearwardly into the discharge chamber 32 as a result of the decreased pressure within the discharge chamber. The material drawn rearwardly displaces the flap 13 so as to enter the discharge chamber 32 through the ports 50 and 52. Directional arrows 54 of FIG. 4 illustrate the forward flow of material out from the discharge ports (50, 52) towards the forward needle 16, while directional arrows 56 illustrate the path of fluid flow of material from the discharge needle back into the discharge chamber 32 through the ports (50, 52). In both directions of flow, the pressure differential in the discharge chamber causing the flow of material also displaces the flap 13 to open the ports (50, 52) to enable flow of material through the ports both into and out of the discharge chamber 32. Accordingly, the decreased pressure in the discharge chamber 32 resulting from the rearward movement of the piston 6 reloads the discharge chamber with material to be subsequently discharged from the dispensing gun by both drawing material forwardly from the rearwardly disposed product container 2, and simultaneously drawing residual material remaining in the needle 16 rearwardly back into the discharge chamber 32. The rearward flow of residual material also serves to prevent dribbling or dripping of this material from the needle to assure that only precisely measured quantities of material are applied during the discharge phase of the dispensing gun only when the trigger is actuated by the user.

It is apparent from the above discussion that the dispensing gun in accordance with the present invention is a vacuum driven system which is adapted to efficiently discharge and deliver precisely metered, pre-selected quantities of material to be applied to a target area in repeatable sequences. The system is designed to operate primarily on pressure differentials generated within the dispensing apparatus,, causing fluid flow in a substantially linear direction through the gun housing. The dispensing gun includes cooperating structure for automatically reloading the discharge chamber for subsequent discharge of material, said reloading occurring simultaneously from a rearwardly disposed product reservoir container, and from forwardly disposed residual material remaining in the device from a prior discharge procedure. The residual material drawn back into the discharge chamber from the forward discharge needle of the device acts to prevent dripping or dribbling of this material from the dispensing device after a discharge sequence.- In this manner, precise and preselected quantities of material will be delivered from the dispensing device during a subsequent discharge operation. A displaceable flap is provided to removably cover at least one outlet port defined at the forward end of the discharge chamber by cooperating with increased and decreased pressure generated in the discharge chamber by advanced and retracted movement of the discharge piston in response to actuation of the trigger.

Preferably, the dispensing gun is designed to deliver precisely metered materials in quantities as small as 0.007 grams in repeatable sequences. The adjustment means for controlling the range of relative movement between the trigger and the handle of the dispensing gun to preselect the quantity of material to be discharged from the dispensing gun, assures that materials will be discharged from the dispensing gun in the same preselected quantities in repeatable sequences, as is desired by the user. The control means also enables adjustment of the preselected quantity of material to be discharged during actuation of the trigger, at the selection of the user. The dispensing gun is designed such that relatively large movements of the trigger relative to the handle are translated into relatively small displacements of the piston into the discharge chamber to enable the precise discharge of small quantities of product. The dispensing device is also designed such that flow of material through the dispensing housing is substantially linear to promote efficient discharge of material from the vacuum driven device. Although the device is primarily adapted to discharge viscous and semi-viscous material including pesticides and insecticides, it may nonetheless be used for dispensing other types of material.

Figure 5A:
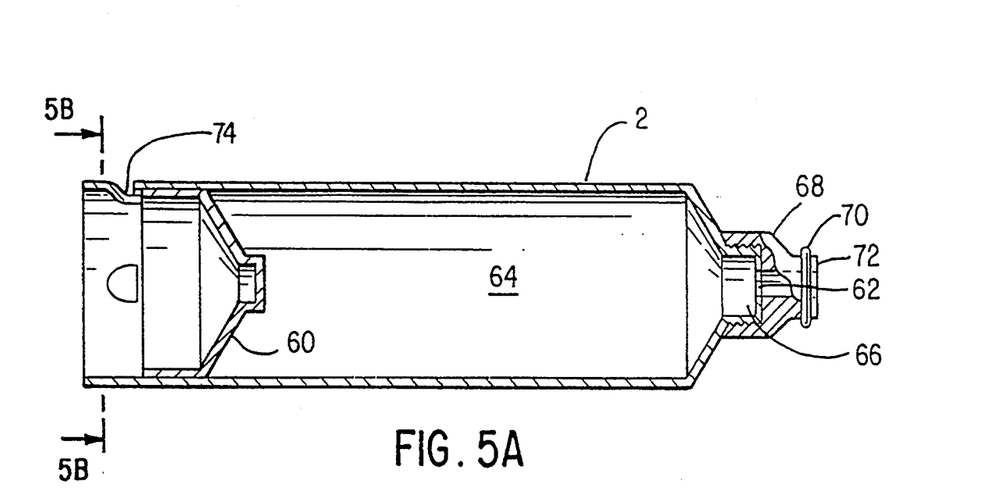
FIGS. 5A and 5B illustrate a further modification of the product tube providing means for retaining a discharge piston therein.
Figure 5B:
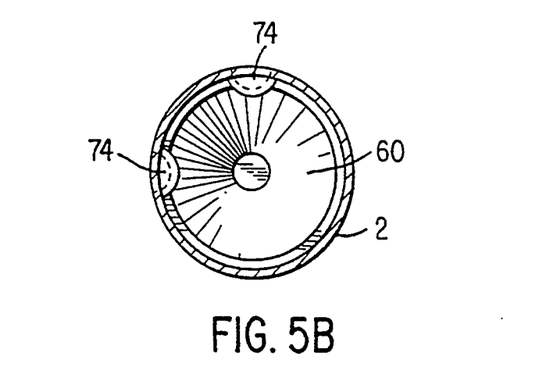

FIGS. 5A and 5B illustrate a further modification of the dispensing gun in accordance with the present invention. FIG. 5A is a side elevational view, in section, of the product tube 2 including a tube piston 60 received therein. The piston is movable within the product tube in a forward direction towards a front discharge nozzle 62 to discharge product 64 stored within the tube. The tapered forward discharge end 66 of the product tube is threadably received within a correspondingly configured outer adapter 68, and a frontwardly mounted O-ring 70 seals the front discharge end 72 of the outer adapter.

The combined structure of the product tube 2 received within the outer forward adapter 68 is itself removably received within the pump housing of the dispensing device of the present invention as discussed with respect to FIG. 1. At least one detent 74 is formed in the product tube 2 by inwardly crimping at least one portion of the product tube behind the position of the tube piston 60. As illustrated in FIGS. 5A and 5B (which is a cross-section taken along line 5B of FIG. 5A), two separate crimped portions 74 are defined on the circular outer periphery of the product tube 2. The crimped portions 74, which are spaced apart from each other by an angle of approximately 100 degrees, provides stop means for defining the rearmost position of the tube piston 60 relative to the product tube 2. In the event that forces or pressure are inadvertently applied to the center of the product tube causing fluid pressure to be exerted rearwwardly on the tube piston 60, the stop means 74 prevent the tube piston itself from being propelled out from the rear of the piston tube which would thereby result in loss of the product 64 through the rear end of the product tube 2.

Figure 6A:
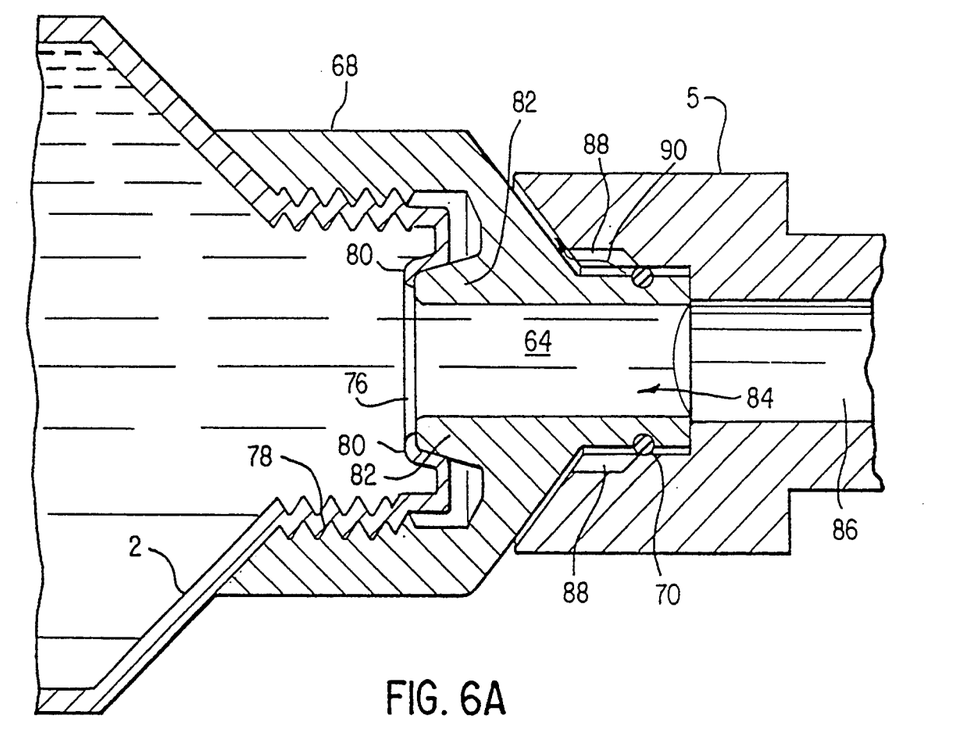
FIGS. 6A and 6B illustrate venting means in the product tube adapter to prevent air from mixing with product within the tube during the mounting of the product tube and adapter to the pump housing.
Figure 6B:
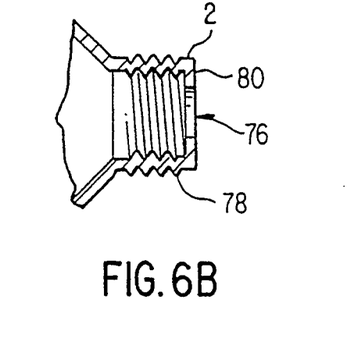

FIGS. 6A and 6B disclosed further modifications to the combination of the adapter 68 and the product tube 2 received therein, as illustrated by FIG. 5A. FIG. 6A illustrates the adapter and product tube in an operative position removably received within the pump housing 5 of the dispensing device in accordance with the present invention (See FIG. 1 of the drawing). FIG. 6B illustrates the forward end of the product tube, including a discharge orifice 76 defined by a forward rim 80, in a non-operative position in which the product tube 2 is not retained within the product tube adapter 68 by the complementary screw threads 78. When the forward end of the product tube 2 is screwed into the product tube adapter 68 by the threads 78, as illustrated by FIG. 6A, a rearwardly extending annular protrusion 82, defined integrally on the product tube adapter 68, abuts directly against the rim portion 80 of the front end of the product tube, slightly displacing the rim in a rearward direction. In this manner, an airtight seal is formed between the forward end of the product tube and the adapter when the product tube is received within the adapter 68 to avoid any leakage or prevent the introduction of air as the liquid product 64 flows through the discharge orifice 76 of the product tube and into a product chamber 84 defined by the adapter 68, as discussed below.

Still referring to FIG. 6A, the product tube adapter 68 defines a central chamber 84 for receiving product 64 from the product tube, when the product tube is received within the adapter. The chamber 84 defined by the adapter is aligned at the rear end thereof with the orifice 76 defined at the forward end of the product tube, and is aligned with a hollow bore 86 defined within the pump housing 5 at the forward end of the chamber 84. Accordingly, in operation of the dispensing device, product is discharged from the product tube 2 through the forward orifice 76, into the chamber 84 and through the hollow bore 86.

When the discharge device is in its operative position, the product tube and adapter are removably received within the pump housing 5, as illustrated by FIG. 6A. The pump housing 5 and the adapter 68 are configured so as to define venting means therebetween, illustrated by vent groove 88. As the product tube and adapter are advanced forwardly into the rear portion of the pump housing 5 for removably mounting the tube and adapter to the pump housing (as, for example, after the tube has been removed to be refilled with product), air occupying the space at the rear of the pump housing is vented through the groove 88 as the adapter is moved into its operating position relative to the rear space defined at the rear end of the pump housing. In this manner, air does not enter the opened forward end of the product chamber 84 of the adapter 68, but air is vented away from the product tube and adapter through the vent groove 88 along a path illustrated by the arrows designated by reference numeral 90. In this manner, air will not mix with the product within the tube, thereby avoiding undesirable results such as loss of pump prime as a result of air mixed with the product to be discharged by the dispensing device.

Figure 7A:
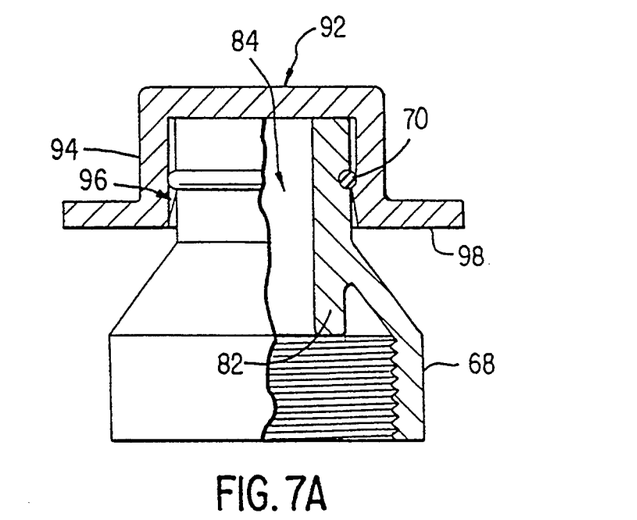
FIGS. 7A and 7B illustrate a cap removably mounted to the discharge end of the product tube including venting means for preventing air from mixing with the product within the tube during mounting of the cap to the tube.
Figure 7B:
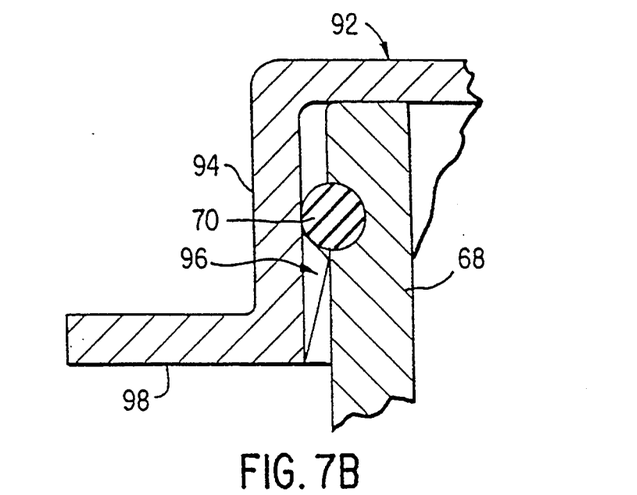
Figure 7C:
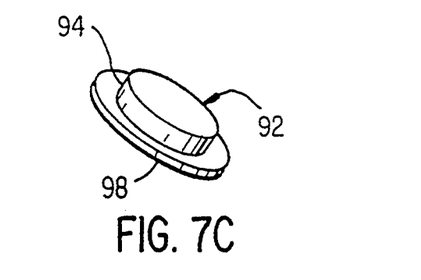

Referring now to FIGS. 7A, 7B and 7C of the drawing, FIG. 7C, illustrates, in perspective, a cap 92 to be removably mounted over the discharge end of the adapter 68 when the product tube 2 is received therein. More specifically, as illustrated by FIG. 7A, the cap 92 seals the opened forward end of the product chamber 84 defined by the adapter 68. The cap is removably mounted over the forward end of the adapter with the product tube received therein when the adapter and the tube filled with product are being stored or transported for insertion into the pump housing 5 of the dispensing device. For example, when a product tube within the dispensing device is depleted, the product tube and the adapter are removed from the pump housing to be refilled with additional product. After the product tube has been refilled, the cap 92 is removably mounted over the discharge end of the adapter to prevent loss of product as the tube is being transported back to the dispensing device to be removably mounted back into the pump housing 5 (as illustrated by FIG. 6A). It is noted that as the product tube is filled or refilled through the forward chamber 84 of the adapter and the adjacent forward orifice 76 of the tube 2, the rear of the product tube is sealed during the forward refilling operation by the tube piston 60 and the stop means 74, as illustrated by FIG. 5A.

After the product tube is removed from the pump housing of the dispensing device and refilled with product to be discharged therefrom, the cap 92 is mounted over the forward discharge end of the adapter to prevent inadvertant loss of product before the product tube and adapter are remounted into the pump housing of the dispensing device. As illustrated in greater detail by FIG. 7B, a downwardly extending skirt portion 94 of the cap 92 defines an inwardly directed ramp segment 96. Vent grooves are defined within the ramp 96 for venting air therethrough as the cap 92 is removably mounted over the forward end of the adapter 68. The ramp 96 also engages the O-ring 70 mounted around the forward end of the adapter 68 to provide a more secure retention of the cap on the adapter. The vent grooves 96 provide means for venting air away from the forward end of the adapter as the cap 92 is advanced over the adapter. In this manner, air is not entrapped within the adapter, and does not mix with the product within the adapter and the product tube, as the cap is placed over the adapter. As previously discussed with respect to the vent means provided in the adapter itself, the introduction of air into the product to be discharged from the product tube results in undesirable effects including the possible loss of pump prime during operation of the dispensing device. The cover 92 includes a lower, outwardly extending flange portion to enable easy mounting and removal of the cap to and from the forward discharge end of the adapter 68.

Other modifications and advantages of the dispensing gun within the scope of the present invention will become apparent to those skilled in the art. Accordingly, the discussion of the preferred embodiments of the invention herein is intended to be illustrative only, and not restrictive of the scope of the invention, that scope being defined by the following claims and all equivalents thereto.

I claim:

1. In a device for dispensing selected quantities of liquid product, said device comprising a housing having an inlet end defining an inlet opening and an outlet end defining a discharge opening, and pump means for causing said liquid product to flow between said inlet opening and said discharge opening of said housing, the improvement comprising:

a product reservoir removably mountable to said housing in fluid communication with said inlet opening defined in said housing, said product reservoir including a piston received therein for discharging product from said product reservoir, said product reservoir including stop means proximate to a rear end thereof for preventing rearward movement of said piston beyond said stop means, said product reservoir removably received within an adapter, said adapter being removably mountable to said housing in an operating position therein for providing fluid communication between the product within said product reservoir and said inlet opening of said housing, and means for venting air from said housing as said adapter and said inlet opening of said housing are moved in a relative direction towards each other.

2. The device as claimed in claim 1 wherein said piston and said product reservoir have corresponding dimensions such that said piston seals the rear end of said product reservoir.

3. The device of claim 1 wherein said stop means is provided by at least one integrally crimped section of said product reservoir.

4. The device of claim 3 wherein said stop means includes at least two integrally crimped sections of said product reservoir, each of said crimped sections spaced apart from each other along the periphery of said product reservoir.

5. The device as claimed in claim 1 wherein said product reservoir is removably received within an adapter, said product reservoir having a forward end including a peripheral rim defining a discharge opening, said adapter defining a product chamber surrounded by a protruding rim portion, said protruding rim portion of said adapter abutting directly against said rim of said product reservoir so as to define a seal between said rim portions of said product reservoir and said adapter.

6. The device as claimed in claim 5 wherein at least a portion of said chamber defined by said adapter is in axial alignment with said discharge opening of said product reservoir.

7. The device as claimed in claim 5 wherein said product reservoir is removably received within said adapter by complementary screw threads defined on an inner surface of a portion of said adapter and on an outer surface of a portion of said product reservoir.

8. The device as claimed in claim 1 wherein said product reservoir including said stop means is mounted in said housing such that an axis extending longitudinally through the center of said product reservoir is substantially in axial alignment with said inlet and discharge openings of said housing.

9. The device as claimed in claim 1 wherein said means for venting includes at least one venting channel defined between adjacent segments of said adapter and said housing when said adapter is received in said operating position within said housing.

10. The device as claimed in claim 9 further including a seal mounted around a portion of said adapter, said seal defining a closed end of said at least one venting channel when said adapter is mounted to said housing.

11. In a device for dispensing selected quantities of liquid product, said device comprising a housing having an inlet end defining an inlet opening and an outlet end defining a discharge opening, and pump means for causing said liquid product to flow between said inlet opening and said discharge opening of said housing, the improvement comprising:

a product reservoir removably mountable to said housing in fluid communication with said inlet opening defined in said housing, said product reservoir including a piston received therein for discharging product from said product reservoir, said product reservoir including stop means proximate to a rear end thereof for preventing rearward movement of said piston beyond said stop means, said product reservoir removably receivable within an adapter, said adapter being removably mountable to said housing in an operating position therein in fluid communication with said inlet opening defined in said housing, said adapter defining an outlet opening for discharge of liquid product from said reservoir, and a cap removably mountable over said outlet opening of said adapter, said cap defining therein means for venting air from said adapter when said cap is mounted to said outlet opening in said adapter.

12. The device as claimed in claim 11 wherein said means for venting includes an inwardly extending segment integrally defined on a portion of said cap, said inwardly extending segment abutting against a portion of an outer surface of said adapter for removably retaining said cap on said adapter.

13. The device as claimed in claim 12 wherein at least one venting channel is defined within said inwardly extending segment of said cap.

14. The device as claimed in claim 12 further including a seal element mounted around said adapter, said inwardly extending segment Of said cap engaging said seal element when said cap is mounted over said outlet opening of said adapter.

15. The device as claimed in claim 14 wherein said seal element comprises at least one O-ring.

16. The device as claimed in claim 11 wherein said product reservoir including stop means is mounted in said housing such that an axis extending longitudinally through the center of said product reservoir is substantially in axial alignment with said inlet and discharge openings of said housing.

17. The device as claimed in claim 11 wherein said piston and said product reservoir have corresponding dimensions such that said piston seals the rear end of said product reservoir.

18. The device of claim 11 wherein said stop means is provided by at least one integrally crimped section of said product reservoir.

19. The device of claim 18 wherein said stop means includes at least two integrally crimped sections of said product reservoir, each of said crimped sections spaced apart from each other along the periphery of said product reservoir.

20. The device as claimed in claim 11 wherein said product reservoir is removably received within an adapter, said product reservoir having a forward end including a peripheral rim defining a discharge opening, said adapter defining a product chamber surrounded by a protruding rim portion, said protruding rim portion of said adapter abutting directly against said rim of said product reservoir so as to define a seal between said rim portions of said product reservoir and said adapter.

* * * * *